United States Patent [19]
Lefur et al.

[11] 3,831,767
[45] Aug. 27, 1974

[54] APPARATUS FOR REMOVING SLUDGE FROM A RECTANGULAR FLOTATION TANK

[75] Inventors: Jean Lefur, Les Etangs; Robert Louboutin, La Celle Saint Cloud; Vincent Savall, Velizy, all of France

[73] Assignee: Degremont Societe Generale D'Epuration et D'Assainissement, Rueil-Malmaison, France

[22] Filed: May 18, 1973

[21] Appl. No.: 361,839

[30] Foreign Application Priority Data
June 20, 1972 France.........................72.22144

[52] U.S. Cl................................ 210/526, 210/530
[51] Int. Cl........................................... B01d 43/00
[58] Field of Search .......... 210/523, 565, 527, 528, 210/530; 198/141

[56] References Cited
UNITED STATES PATENTS
1,953,100  4/1934  Blaisdell............................ 210/526
2,249,049  7/1941  Sayers et al..................... 210/530 X
3,477,578  11/1969  Bahr ............................ 210/530 X
3,612,246  10/1971  Elze et al. ....................... 198/141 X Primary Examiner—Granville Y. Custer, Jr.
Attorney, Agent, or Firm—Wenderoth, Lind & Ponack

[57] ABSTRACT

An apparatus for extracting sludge from a rectangular sewage flotation tank comprises a bridge structure having rotatably mounted thereon a horizontal drum driven for rotation and provided with suitably shaped vanes, the direction of rotation of the drum and vane assembly being such that at the point of contact thereof with the scraped surface the direction of its velocity vector is opposed to the direction of travel of the bridge structure. The bridge structure also includes a suitably shaped scraper blade pushing the sludge continuously towards the front of the movable vanes of the drum, whereby the extracted sludge is fed to a discharge device mounted inside the tubular shaft of the drum and provided with means for directing the sludge into a container secured to the bridge.

7 Claims, 4 Drawing Figures

APPARATUS FOR REMOVING SLUDGE FROM A RECTANGULAR FLOTATION TANK

BACKGROUND OF THE INVENTION

This invention relates to an apparatus for the continuous extraction of sludge from the surface of a rectangular flotation tank and is applicable more particularly to rectangular flotation tanks of the type utilized in sewage disposal or water treatment plants.

Hitherto known apparatus for the continuous extraction of sludge from the surface of flotation tanks comprise a set of chain-driven vanes adapted to carry along the sludge floating more or less on the surface, from one end to the other end of the tank. In a flotation tank of relatively large dimensions, these vane apparatus make it necessary to drive the sludge along considerable distances and for obvious reasons, particularly in the case of relatively thick and heavy sludge, this is attended by the inconvenience of limiting the extraction rate since the quantity of sludge accumulating in front of each vane rapidly rises to excessive values. Thus, some of the sludge escapes from the vane extraction movement and remains on the surface and is compressed. In the conventional method utilizing gaseous bubbles for activating the sludge, the latter loses its gaseous content and therefore the solid particles in the sludge become heavier than the vehicle-forming water and drop to the bottom of the tank, thus reducing considerably the efficiency of the flotation tank. To avoid this inconvenience it was proposed to increase the number of vanes, but this leads only to an increase in the final cost of the plant, without in most instances providing a satisfactory solution to the problem.

SUMMARY OF THE INVENTION

The apparatus according to the present invention is free of this inconvenience and permits extracting of sludge continuously without any risk of accumulating such sludge and without disturbing the scraped surface.

Another substantial advantage obtained with this apparatus is that it permits extracting of sludge from the surface of flotation tanks of relatively great dimensions, notably of great length.

This invention provides an apparatus for continuously extracting sludge from the surface of a rectangular flotation tank this apparatus comprising a movable bridge structure adapted to travel in a direction parallel to the major dimension or length of the tank over which the bridge structure is movable. The bridge structure includes a drum consisting of a pair of parallel spaced vertical circular flanges between which a plurality of scraper vanes are rigidly mounted, this drum being adapted to rotate about a horizontal axis and characterized in that its direction of rotation is such that at its point of contact with the scraped surface the direction of its velocity vector is opposed to the direction of travel of the bridge structure proper.

Advantageously, this bridge structure is provided with a scraper blade of adequate configuration, adapted to push the sludge continuously towards the movable vanes of the drum, the vanes propelling the extracted sludge towards collecting means secured to the bridge structure.

BRIEF DESCRIPTION OF THE DRAWINGS

A typical embodiment of the present invention will now be described by way of example with reference to the attached drawings, in which.

DETAILED DESCRIPTION OF PREFERRED EMBODIMENT OF THE INVENTION

The apparatus is mounted on top of the flotation tank and adapted to travel parallel to the length or major dimension thereof throughout the length of the tank, so that the sludge is removed from the entire surface of the flotation tank.

Figure 1:
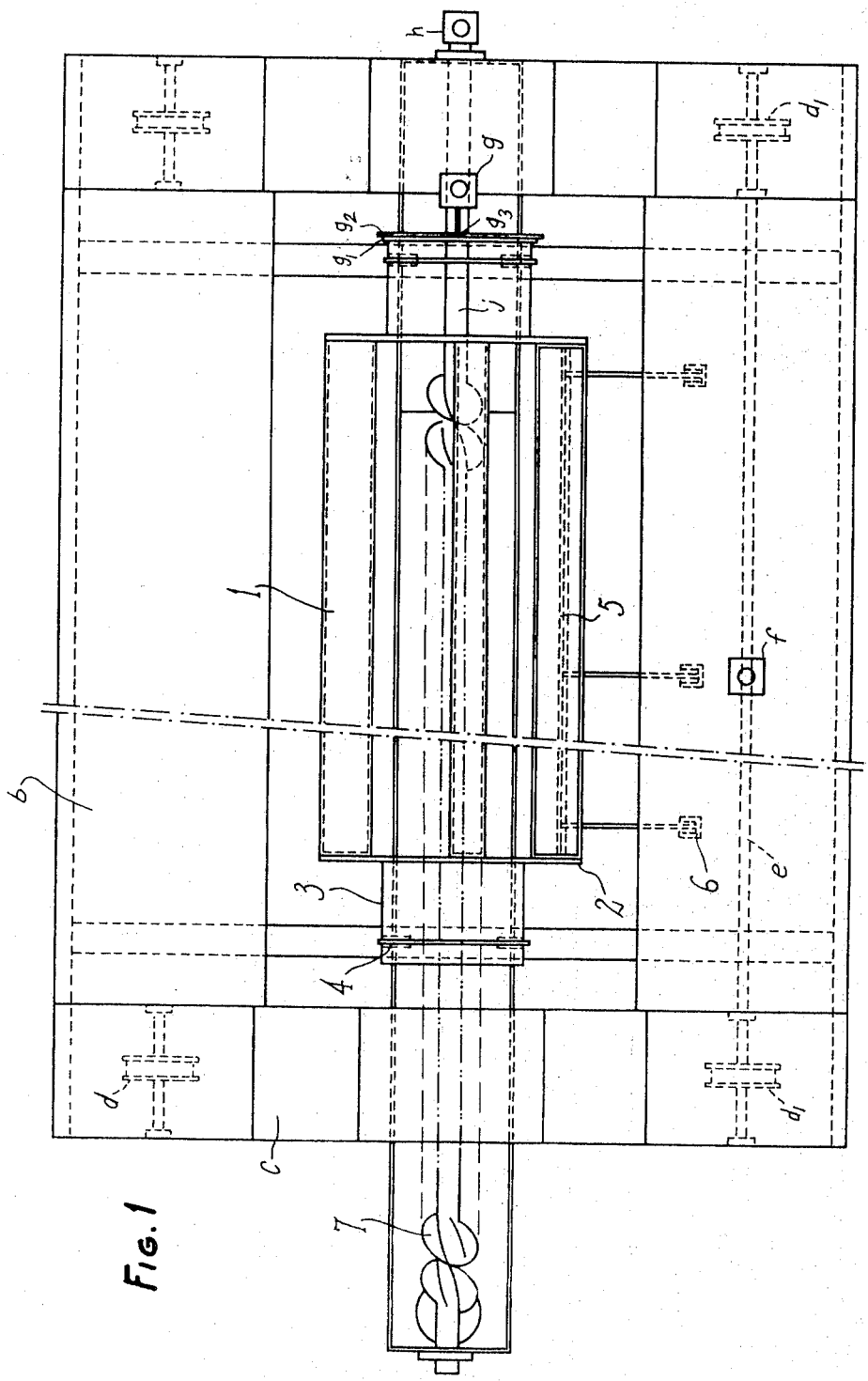
FIG. 1 is a diagrammatic plan view above of an apparatus constructed according to the basic principle of this invention.
Figure 2:
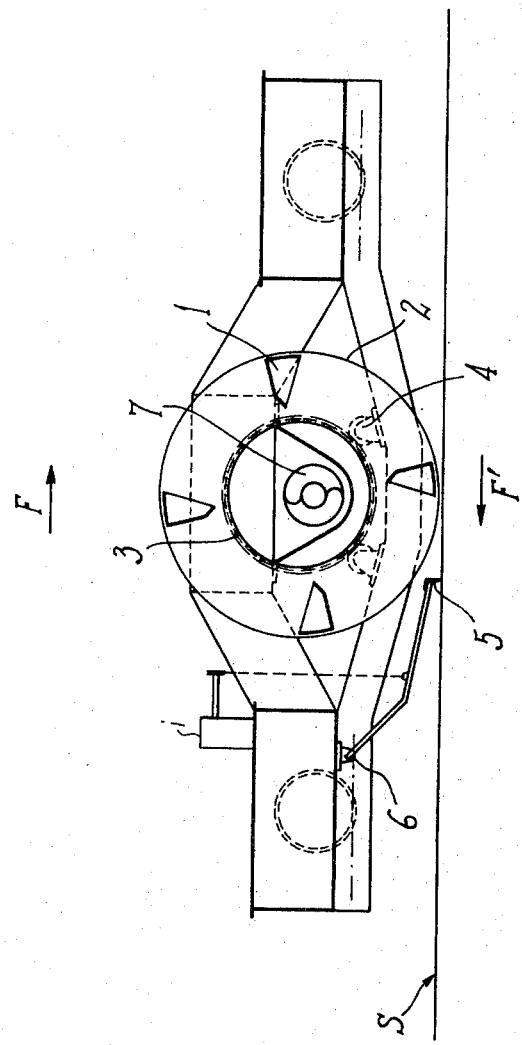
FIGS. 2 and 3 are a cross sectional view and a longitudinal sectional view respectively, of the same apparatus.
Figure 3:
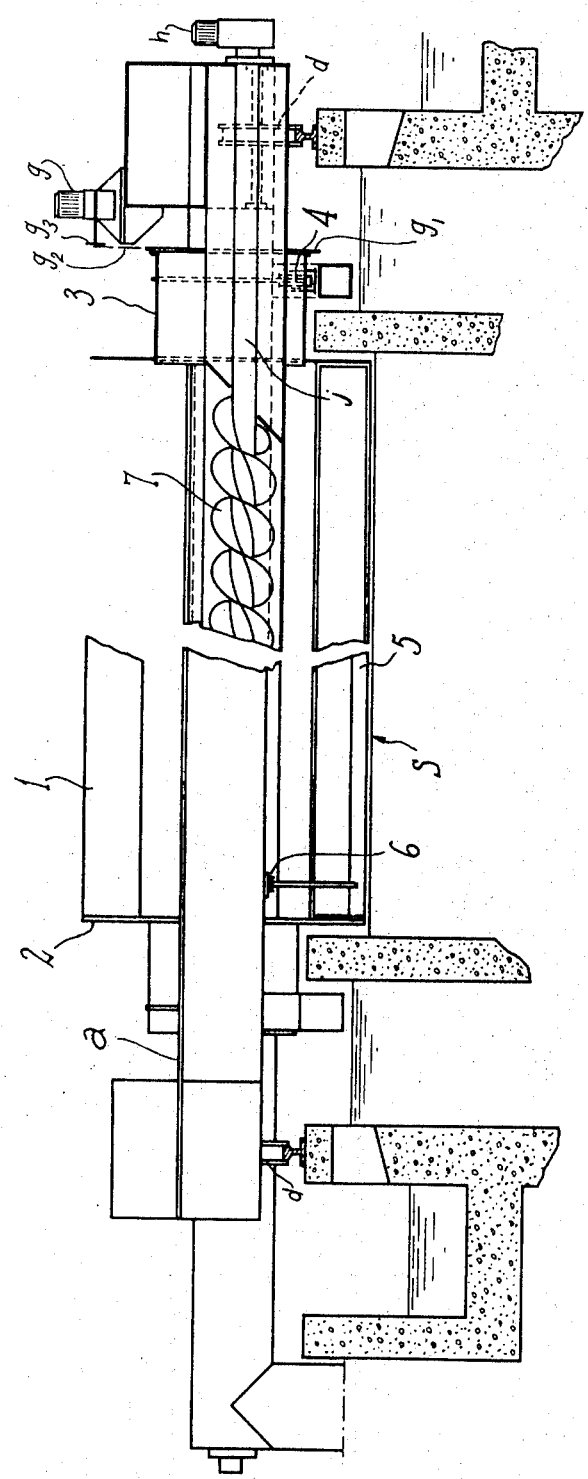

This apparatus comprises essentially:

a movable bridge structure $a$ consisting in a known fashion of a pair of transverse supporting members $b$ interconnected by a pair of beams $c$. The movable bridge structure is supported by four wheels $d$ of which two $d_1$ are operatively connected by a shaft $e$ to a power unit of motor $f$, and is adapted to travel in a direction parallel to the length of the tank, i.e., in the direction of the arrow F as shown in FIG. 2;

a drum comprising an axial shaft supporting adjacent its ends a pair of spaced circular parallel flanges 2 between which are secured the vanes 1 adapted to drive the sludge floating on the surfaces of the flotation tank. Each flange 2 has a cylindrical extension 3 permitting the supporting of the assembly by means of rollers 4 carried by the bridge structure. The scraper vanes are advantageously of bucket configuration for the dual purpose of facilitating the sludge removal (and the discharge thereof in their inclined position) and properly scraping the sludge without disturbing the scraped surface.

The drum rotates about a horizontal axis in such direction of rotation that at the point of contact between the vanes and the scraped surface the direction of the velocity vector $F'$ of the drum is opposed to the direction of travel of the bridge structure proper. The relative speed of the movable vanes with respect to the sludge is thus reduced, and this will avoid a detrimental disturbance in the level of the scraped surface. The drum is rotatably driven by a motor $g$ through a sprocket wheel $g_1$, a chain $g_2$ and a sprocket pinion $g_3$.

A scraper blade 5 is secured to the bridge, behind the drum, and pivotally mounted in a support 6, and operable by means such as motor $i$ to be selectively raised during the return travel of the scraper bridge. This blade 5 is lowered during the sludge extraction stroke or movement of the bridge.

Due to the opposite directions of rotation of the drum and movement of the bridge structure, this scraper blade pushes the sludge continuously towards the front of the movable vanes and the sludge is extracted thereby. This arrangement permits extracting of sludge of any consistency, including sludge having a natural tendency to behave like a liquid mass.

A sludge extraction device is mounted on the bridge structure. According to a typical embodiment of this invention, this sludge extraction device comprises essentially an Archimedean screw 7 disposed within a trough within the tubular center of the drum and vane assembly, and driven by a motor h through a shaft.

Figure 4:
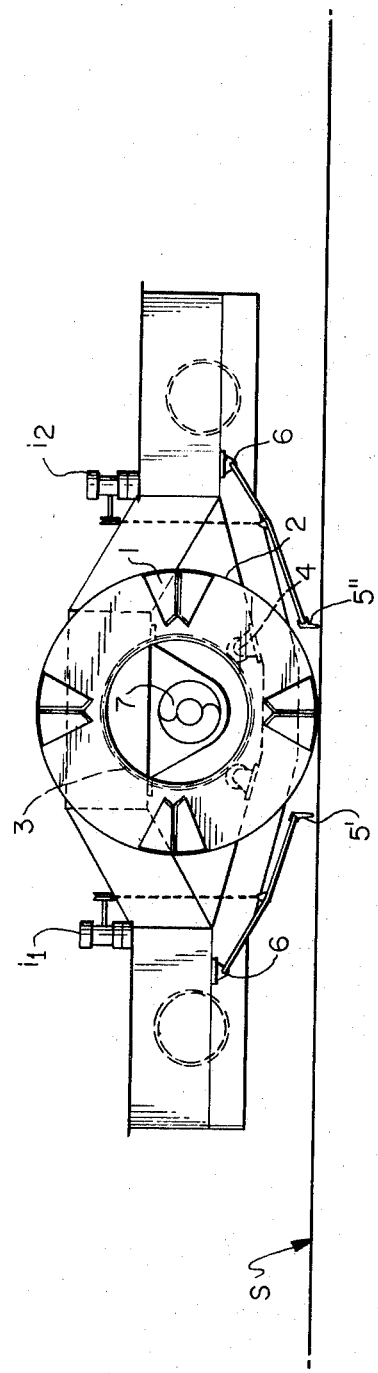
FIG. 4 is a view, similar to FIG. 2, of a modified embodiment of the invention.

According to an advantageous embodiment of this invention, the sludge extraction device is also operative during the return stroke of the movable bridge structure. In this case the apparatus comprises a pair of scraper blades 5' and 5'' disposed symmetrically in relation to the drum and vane assembly, these blades being selectively alternately operable, according to the direction of travel of the bridge structure, one blade being raised while the other is in its operative or lower position. Raising and lowering of blades 5' and 5'' is respectively about pivot supports 6 by selective actuation of motors $i_1$ and $i_2$. In this case the direction of rotation of the drum is reversed automatically according to the direction of travel of the bridge structure, and the movable vanes have a symetric profile, as shown in FIG. 4, permitting scraping of the sludge in one or the other direction.

In an alternate embodiment of the apparatus the sludge extracted from the tank is stored in a container secured to the movable bridge and discharged or drained when the bridge has completed its stroke.

Of course, various modifications and variations may be brought to the specific embodiments shown, described and suggested herein, without departing from the basic principle of the invention as set forth in the appended claims, as will readily occur to those skilled in the art.

What is claimed is:

1. An apparatus for extracting sludge from the upper surface of liquid sewage contained in a rectangular flotation tank, said apparatus comprising:
   a movable bridge structure positioned above said tank to extend thereacross;
   a drum assembly including a horizontal tubular shaft rotatably mounted on said bridge structure, a pair of parallelly spaced circular flanges vertically rigidly attached to said tubular shaft adjacent opposite lateral walls of said tank, a plurality of extraction vanes horizontally mounted and rigidly connected to said flanges, said vanes being positioned such that upon rotation of said drum assembly said vanes move into and pickup said sludge;
   means for moving said bridge structure and drum assembly longitudinally above said tank;
   at least one scraper blade pivotally mounted on said bridge structure at a position to scrape said sludge toward said vanes upon movement of said bridge structure;
   means for rotating said drum assembly about a horizontal axis to sequentially pick up sludge scraped by said at least one scraper blade; and
   the direction of rotation of said drum assembly and said vanes being such that at the point of contact between said vanes and said sludge the direction of the velocity vector of said drum assembly is opposed to the direction of travel of said bridge structure, whereby during the operation of said apparatus said scraper blade continuously pushes said sludge toward said rotating vanes.

2. An apparatus as claimed in claim 1, further comprising means positioned within said drum assembly for receiving the sludge removed by said vanes and transporting said removed sludge away from said apparatus.

3. An apparatus as claimed in claim 1, wherein said at least one scraper blade comprises two scraper blades pivotally attached to said bridge structure and arranged symmetrically on opposite sides of said drum assembly; said means for moving said bridge structure comprises means for selectively moving said bridge structure in opposite directions longitudinally over said tank; and said means for rotating comprises means for selectively rotating said drum assembly in opposite directions about said horizontal axis, as a function of the direction of longitudinal movement of said bridge structure.

4. An apparatus as claimed in claim 3, wherein each of said extraction vanes has a symmetrical lateral cross-sectional profile capable of picking-up sludge upon rotation of said drum assembly in either of said opposite directions about said horizontal axis.

5. An apparatus as claimed in claim 1, wherein said tubular shaft comprises cylindrical extensions extending laterally from the outer lateral sides of said flanges, and further comprising rollers mounted on said bridge structure and bearing on said cylindrical extensions for allowing rotation of said drum assembly.

6. An apparatus as claimed in claim 5, further comprising means positioned coaxially within said drum assembly for receiving sludge removed by said vanes and transporting said removed sludge away from said apparatus.

7. An apparatus as claimed in claim 6, wherein said means for receiving and removing sludge comprises a trough and an Archimedean screw.

* * * * *